United States Patent [19]

Miller et al.

[11] Patent Number: 5,926,811
[45] Date of Patent: Jul. 20, 1999

[54] STATISTICAL THESAURUS, METHOD OF FORMING SAME, AND USE THEREOF IN QUERY EXPANSION IN AUTOMATED TEXT SEARCHING

[75] Inventors: David James Miller, Dayton; Xin Allan Lu, Springboro; John David Holt, Centerville, all of Ohio

[73] Assignee: Lexis-Nexis, Miamisburg, Ohio

[21] Appl. No.: 08/616,883

[22] Filed: Mar. 15, 1996

[51] Int. Cl.⁶ ..................................................... G06F 17/21
[52] U.S. Cl. .......................... 707/5; 707/3; 707/4; 707/7; 707/513; 707/532
[58] Field of Search ................................... 395/603, 604, 395/605, 607, 761, 794; 707/3, 4, 5, 7, 513, 532

[56] References Cited

U.S. PATENT DOCUMENTS

| | | | |
|---|---|---|---|
| 4,870,568 | 9/1989 | Kahle et al. ............................. | 364/200 |
| 4,876,643 | 10/1989 | McNeill et al. ......................... | 364/200 |
| 5,136,289 | 8/1992 | Yoshida et al. ......................... | 341/67 |
| 5,297,039 | 3/1994 | Kanaegami et al. ................... | 364/419.13 |
| 5,410,475 | 4/1995 | Lu et al. ................................. | 364/419.01 |
| 5,469,355 | 11/1995 | Tsuzuki ................................. | 364/419.19 |
| 5,481,742 | 1/1996 | Worley et al. ......................... | 395/800 |
| 5,615,378 | 3/1997 | Nishino et al. ......................... | 395/754 |
| 5,619,709 | 4/1997 | Caid et al. .............................. | 395/794 |
| 5,675,819 | 10/1997 | Schuette ................................ | 395/760 |
| 5,717,914 | 2/1998 | Husick et al. ........................... | 707/5 |
| 5,721,902 | 2/1998 | Schultz .................................. | 707/4 |

OTHER PUBLICATIONS

Ahlswede, Thomas, et al., "Automatic Construction of a Phrasal Thesaurus for an Information Retrieval System from a Machine Readable Dictionary", *Proceedings of RIAO '88*, Cambridge, Massachusetts, Mar. 1988, pp. 597–608.

Salton, Gerard, et al., "*B Automatic Thesaurus Construction", from Chapter 3 of *Introduction to Modern Information Retrieval*, McGraw–Hill, New York, 1983, pp. 78–81.

Peat, Helen J., et al., "The Limitations of Term Co–Occurrence Data for Query Expansion in Document Retrieval Systems", *Journal of the American Society for Information Science*, vol. 42, No. 5, 1991, pp. 378–383.

(List continued on next page.)

*Primary Examiner*—Thomas G. Black
*Assistant Examiner*—Jean R. Homere
*Attorney, Agent, or Firm*—Thelen Reid & Priest LLP

[57] ABSTRACT

A statistical thesaurus is built dynamically, from the same text collection that is being searched, allowing improved generation of expanded query terms. The thesaurus is dynamic in that thesaurus records are collected, ranked, accessed, and applied dynamically. Thesaurus "records" are actually formed as indexed documents arranged in "collections". The collections are preferably distinguished based on text source (court cases versus news wires versus patents, and so forth). Each record has terms assembled in indexed groups (or segments) which inherently reflect a ranking based on relevance to an initial query. After an initial query is received, the appropriate collection(s) of records may be searched by a conventional search and retrieval engine, the searches inherently returning records ranked by degree of relevance due to the record indexing scheme. A record ranking scheme avoids contamination of relevant records by less relevant records. The record selection and the expansion query term generation processes are each divided into parallel threads. The separate threads correspond to respective text sources to enable the improved expansion query term generation to be provided in real time.

19 Claims, 10 Drawing Sheets

OTHER PUBLICATIONS

Minker, Jack et al., "An Evaluation of Query Expansion by the Addition of Clustered Terms for a Document Retrieval System", *Information Storage & Retrieval*, Pergamon Press, Great Britain, vol. 8, 1972, pp. 329–348.

Crouch, Carolyn J., et al., "Experiments in Automatic Statistical Thesaurus Construction", Department of Computer Science, University of Minnesota, Duluth, Proceedings of the 15th International ACM–SIGIR Conference on Research and Development in Information Retrieval, Copenhagen, Denmark, 1992, pp. 77–88.

Crouch, C. J., "An Approach to the Automatic Construction of Global Thesauri", *Information Processing & Management*, Pergamon Press plc, Great Britain, vol. 26, No. 5, 1990, pp. 629–640.

Lesk, M. E., Division of Engineering and Applied Physics, Harvard University, "Word–Word Associations in Document Retrieval Systems", *American Documentation*, vol. 20, Jan. 1969, pp. 27–38.

SYNONYM SELECTION
(CONVENTIONAL THESAURUS)

Synonyms for: MURDER
Enter synonym numbers to include in search and press ENTER (e.g. 1,2,3-4)

<=1> Exit Thesaurus

---

| 1 murdered | 2 murderer | 3 murdering |

---

| 4 act of killing | 5 act of slaying | 6 act of taking life |
| 7 assassination | 8 destruction | 9 destruction of life |
| 10 destructiveness | 11 elimination | 12 genocide |
| 13 homicide | 14 intentional killing | 15 killing |
| 16 liquidation | 17 massacre | 18 taking a human life |
| 19 unlawful killing | 20 violent death | |
| 21 destruction of human life | | |

*FIG. 6*

RELATED CONCEPTS SELECTION
(STATISTICAL THESAURUS)
(BASED ON NEWS WIRES)

TOPIC: MURDER
Enter concept numbers of interest and press ENTER (e.g. 1,2,3-4)

<=1> Exit Related concepts

---

| | |
|---|---|
| 1 crime | 2 charge |
| | 4 charged |
| 5 killing | 6 text |
| 7 victim | 8 shot |
| 9 count | 10 killed |
| 11 case | 12 convicted |
| 13 homicide | 14 prosecutor |
| 15 defendant | 16 suspect |
| 17 jury | 18 arrested |
| 19 investigation | 20 violence |
| 21 accused | 22 attorney |
| | 24 boy |
| 25 pleaded guilty | 26 prison |

*FIG. 7*

RELATED CONCEPTS SELECTION
(STATISTICAL THESAURUS)

TOPIC: WHITEWATER
Enter concept numbers of interest and press ENTER (e.g. 1,2,3-4)

<=1> Exit Related concepts

| | |
|---|---|
| 1 White House | 2 hearing |
| 3 investigation | 4 Clinton |
| 5 loan | 6 question |
| 7 Clinton | 8 partner |
| 9 counsel | 10 Bill Clinton |
| 11 Whitewater Developement Corp. | 12 official |
| 13 tax return | 14 RTC |
| 15 estate | 16 failed |
| 17 special counsel | 18 Madison Guaranty |
| 19 Vincent Foster | 20 campaign |
| 21 document | 22 health care |
| 23 matter | 24 text |
| 25 Hillary Rodham Clinton | 26 Little Rock |

FIG. 8

RELATED CONCEPTS SELECTION
(STATISTICAL THESAURUS)
(BASED ON LEGAL MATERIAL)

TOPIC: MURDER
Enter concept numbers of interest and press ENTER (e.g. 1,2,3-4)

<=1> Exit Related concepts

| | |
|---|---|
| 1 capital murder | 2 indictment |
| 3 reasonable doubt | 4 victim |
| 5 lesser | 6 shot |
| 7 point of error | 8 death penalty |
| 9 deceased | 10 robbery |
| 11 ground of error | 12 punishment |
| 13 killing | 14 intentionally |
| 15 juror | 16 accomplice |
| 17 commit | 18 double jeopardy |
| 19 extraneous offense | 20 guilt |
| 21 habeas corpus | 22 writ of habeas corpus |
| 23 due process | 24 first degree murder |
| 25 human life | 26 indicted |

FIG. 9

INDEX

*FIG. 10A*

TOP 100 RECORD LIST (RANKED RECORDS)

|  | COLLECTION # | DOCUMENT # | SCORE |
|---|---|---|---|
| ENTRY 100 | 0001 | 10 | 14 |
| 99 | 0001 | 12 | 14 |
| 98 | 0001 | 118 | 10 |
| ⋮ |  |  |  |
| 01 |  |  |  |

*FIG. 10B*

WORK FILE RECORD

```
  1 BYTE    1 TO 25 BYTES
| LENGTH |     TEXT      |
```

EXAMPLES

```
|   6   |   MURDER   |
```

*FIG. 11A*

TOP 26 TERMS TABLE

|  | FREQUENCY | LENGTH | TEXT |
|---|---|---|---|
| ENTRY 26 | 12 | 14 | CAPITAL MURDER |
| 25 | 10 | 10 | INDICTMENT |
| 24 | . |  |  |
| . |  |  |  |
| . |  |  |  |
| 1 |  |  |  |

*FIG. 11B*

COLLECTION MAP

| SOURCE BEING SEARCHED BY USER | NUMBER OF THESAURUS COLLECTIONS | LIST OF THESAURUS COLLECTIONS |
|---|---|---|
| GENFED | 10 | 0001, 0002, ... 0010 |
| NEWS | 5 | 0020, 0021, ... 0025 |
| PATENT | 2 | 0030, 0031 |

STATISTICAL THESAURUS, METHOD OF FORMING SAME, AND USE THEREOF IN QUERY EXPANSION IN AUTOMATED TEXT SEARCHING

BACKGROUND OF THE INVENTION

1. Field of the Invention

The present invention relates generally to the field of automated search and retrieval of text documents. More specifically, the invention relates to thesauri (especially statistical thesauri), to the structures of the statistical thesauri, to methods of forming the statistical thesauri, and to use of the statistical thesauri in query expansion.

2. Related Art

It is known in the field of information retrieval that both precision and recall can be greatly improved when queries are expanded to contain a larger number of good search terms. A thesaurus can be used to increase the number of good search terms.

A statistical thesaurus is a thesaurus which contains terms that are related to the headword by their co-occurrence with the headword in text. This is in contrast to a traditional thesaurus whose terms, synonyms, are related to the headword by meaning.

Figure 6:
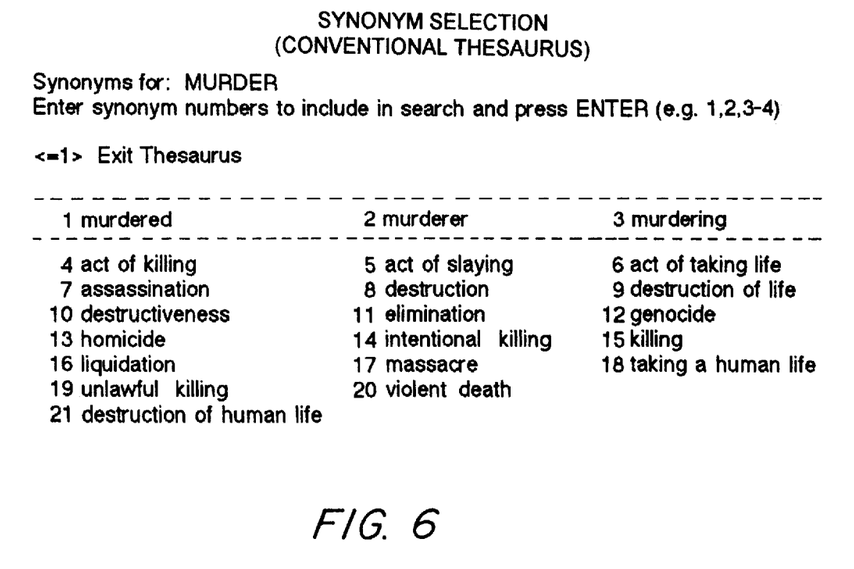
FIG. 6 illustrates synonyms for the headword "murder" from a traditional (meaning-based) thesaurus.
Figure 7:
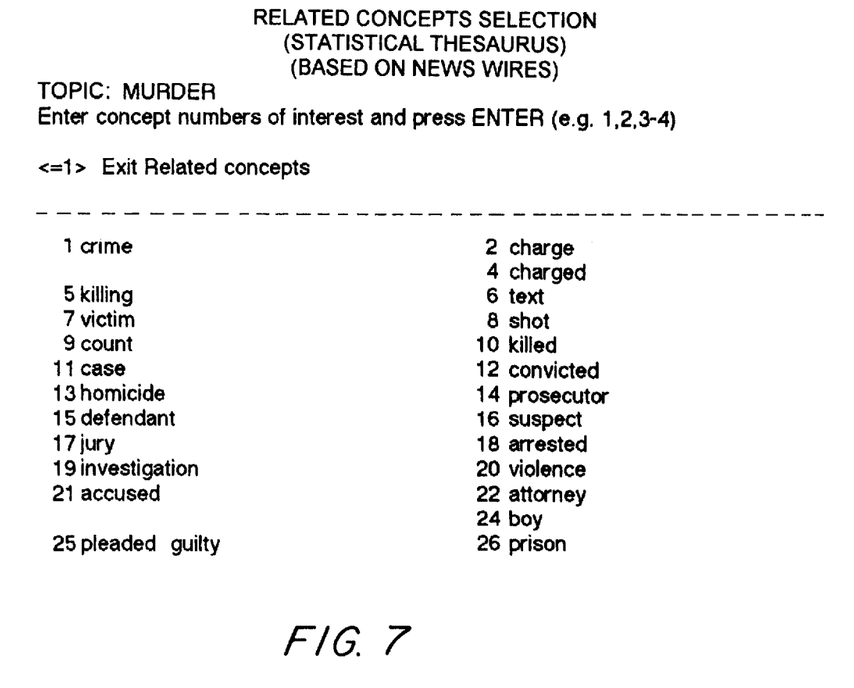
FIG. 7 illustrates related concepts from a statistical (co-occurrence-based) thesaurus using news-based material.

Recent research has shown that a statistical thesaurus provides good search terms when used for query expansion, while traditional thesauri provide little improvement and may actually hurt overall performance. As an example, FIG. 6 illustrates synonyms for the headword "murder" from a traditional thesaurus, while FIG. 7 illustrates the related concepts from a statistical thesaurus.

Figure 8:
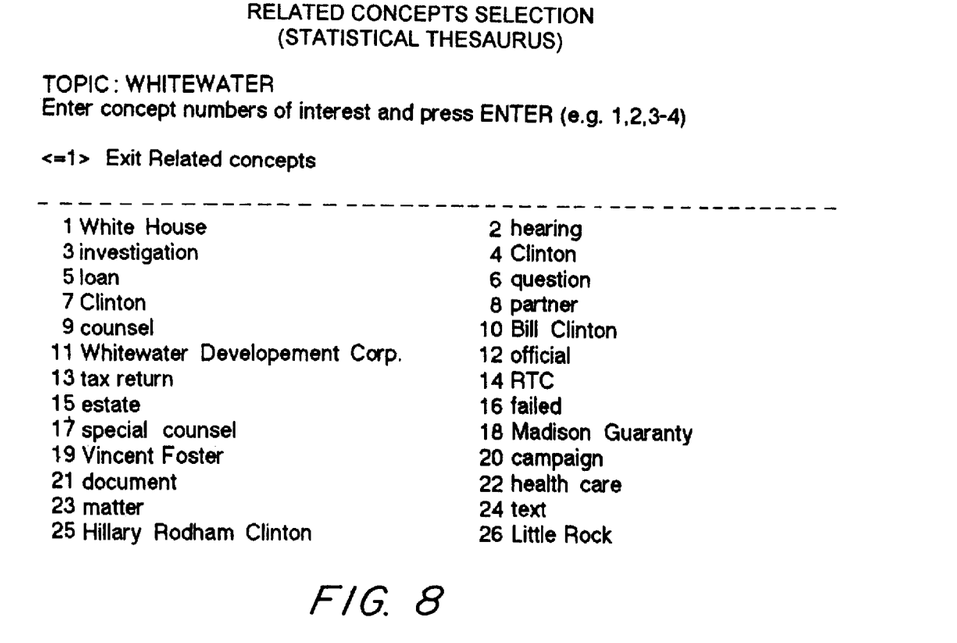
FIG. 8 illustrates related concepts for the term "Whitewater" resulting from use of a statistical thesaurus.

Statistical thesauri can also provide related concepts for many terms not found in a traditional thesaurus, including current events. For example, FIG. 8 illustrates the related concepts for the term "Whitewater". This meaning of the term "Whitewater" cannot be found in any traditional thesaurus.

Therefore, a high performance statistical thesaurus is a very useful tool in an information retrieval system. It is to improving the formation, structure and use of statistical thesauri that the present invention is directed.

SUMMARY OF THE INVENTION

The inventive statistical thesaurus provides a high degree of performance, is scalable to multiple users and large amounts of source information, and is tunable to specific source information. The thesaurus works best when it is built from the text collection being searched. In order to meet these requirements the inventive dynamic, parallel thesaurus is provided.

A statistical thesaurus is built dynamically, from the same text collection that is being searched, allowing improved generation of expanded query terms. The thesaurus is dynamic in that thesaurus records are collected, ranked, accessed, and applied dynamically. Thesaurus "records" are actually formed as indexed documents arranged in "collections". The collections are preferably distinguished based on text source (court cases versus news wires versus patents, and so forth). Each record has terms assembled in indexed groups (or segments) which inherently reflect a ranking based on relevance to an initial query. After an initial query is received, the appropriate collection(s) of records may be searched by a conventional search and retrieval engine, the searches inherently returning records ranked by degree of relevance due to the record indexing scheme. A record ranking scheme avoids contamination of relevant records by less relevant records. The record selection and the expansion query term generation processes are each divided into parallel threads. The separate threads correspond to respective text sources to enable the improved expansion query term generation to be provided in real time.

More specifically, the invention provides a dynamic statistical thesaurus including a collection of records which contain weighted term relationships. The statistical thesaurus is divided into multiple indexed collections based on sampled source material, and is searched interactively to construct a list of related concepts for one or more expanded query terms.

The invention also provides a ranking method for collecting ranking term relationship records, and then deriving a final set of related concepts. The ranking method uses descending term weights for each query term, and sums the weights to determine the score. Furthermore, the method ranks up to (for example) 100 records, but will use as few as (for example) 25 records when a large change in score occurs, or as few as (for example) 50 records when any change in score occurs.

Moreover, the invention provides a statistical thesaurus structure which stores the collection of logical term relationship records as a document in which the terms are grouped by term weight in different indexed sections (segments) of the document. This allows a conventional document retrieval system to build the index, and create the candidate set of records for ranking.

The invention further provides a method of parallel processing which involves dividing the statistical thesaurus into small physical collections, each with its own index, searching the multiple collections simultaneously, and merging the search results.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

query expansion, the list of terms to be used for expansion is constructed, and the statistical thesaurus is accessed.

Unlike a traditional thesaurus, all requested terms are processed together to provide a single set of related concepts. The related concepts are then displayed to the user who can select which, if any, of the concepts to include within the query. The query can then be expanded again, or run by the user.

The statistical thesaurus' structure and content, as well as its method of construction are first described. Then, a method of retrieval of related concepts using the thesaurus will be described.

Figure 15:
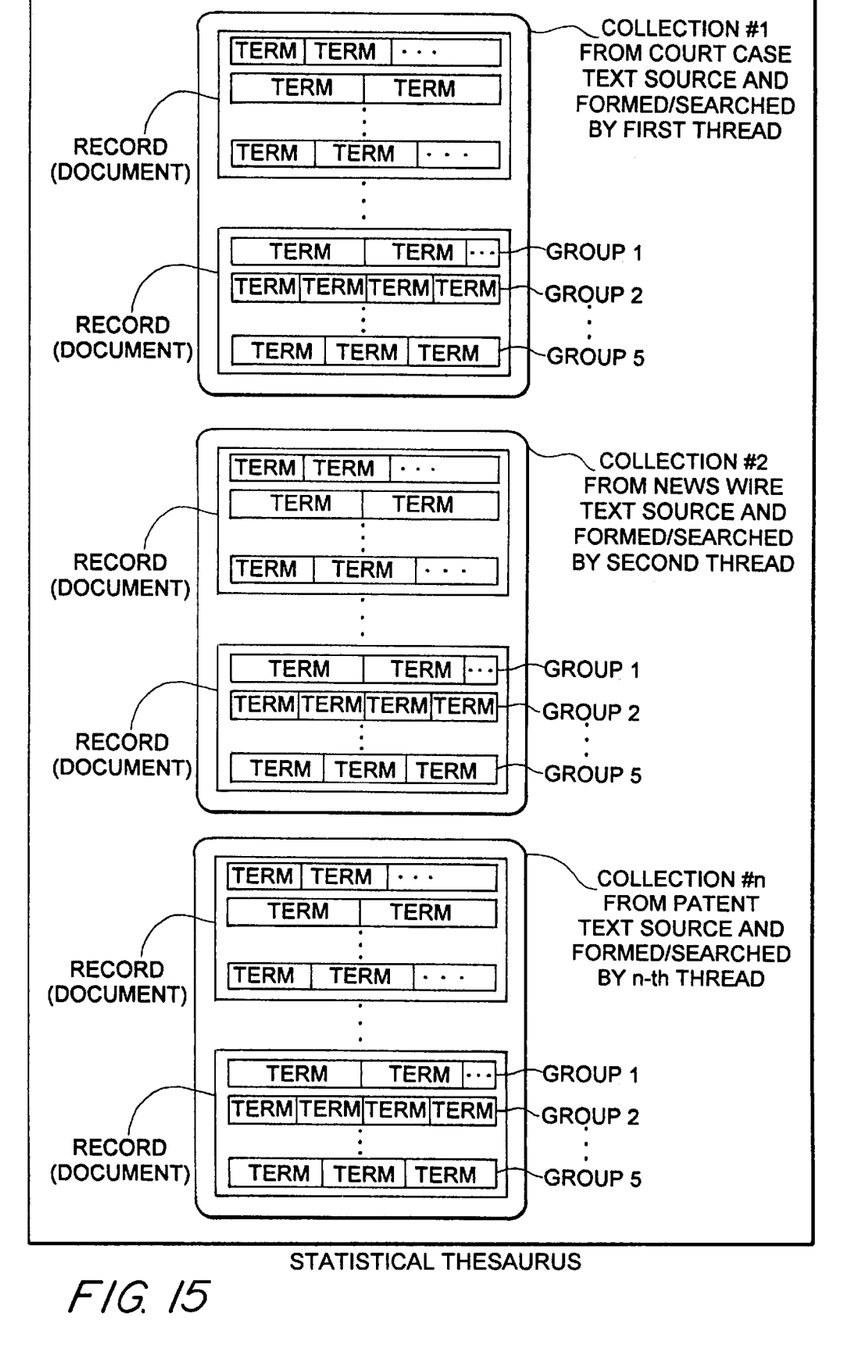

To summarize terminology, FIG. 15 illustrates the hierarchical relationship of the following terms according to a preferred embodiment of a statistical thesaurus according to the present invention:

A. ☞ Collections form the statistical thesaurus
   Text Sources are the basis of respective collections
   Threads in software can form and search respective collections
B. ☞ ☞ Records in each collection are based on respective documents
C. ☞ ☞ ☞ Groups of terms are found in each record
D. ☞ ☞ ☞ ☞ Terms can include one or more words.

FIG. 15 illustrates the relationship of the collections, text sources, threads, records (records correspond to documents), groups, and terms, according to a preferred embodiment of the statistical thesaurus according to the present invention.

DETAILED DESCRIPTION OF THE PREFERRED EMBODIMENTS

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

A static thesaurus is built once, and accessed many times. For example, a standard thesaurus is published in the form of a book, with a fixed set of synonyms for each headword. All of the work is done before the text is published.

For a statistical thesaurus, the related terms for a headword vary depending on the source text collection being searched, and over time as new material is added to the collection. Rebuilding a static list of related terms and headwords would be very computation-intensive and time consuming, limiting the ability to tune the thesaurus by source text collection and keep it current.

Figure 9:
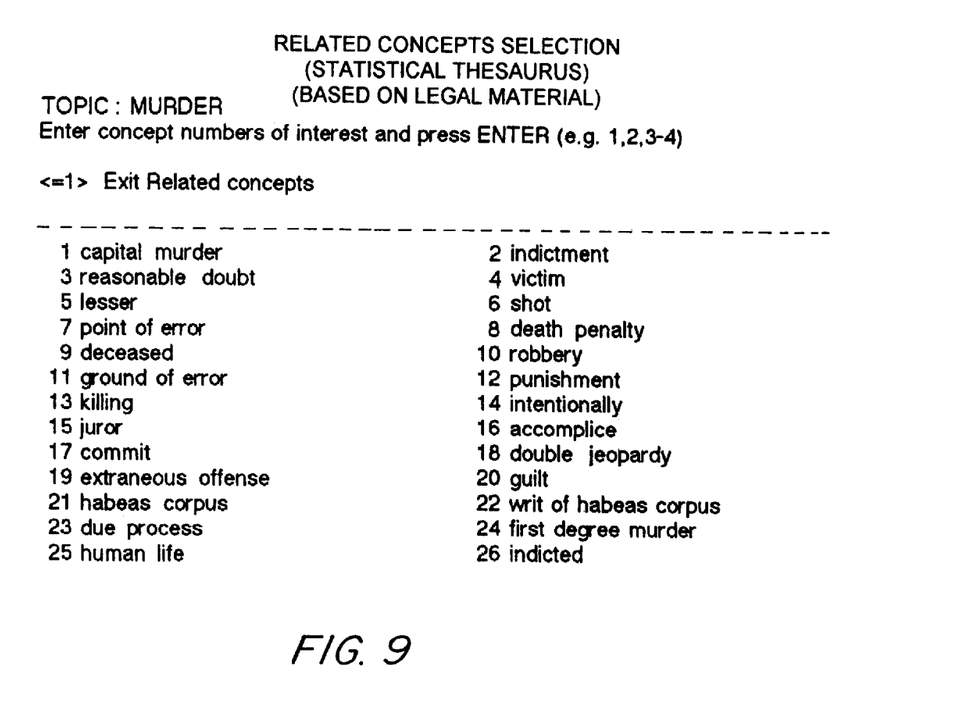
FIG. 9 shows related concepts from a statistical thesaurus using GENFED (legal material) searches.

As examples of a collection-specific statistical thesaurus, reference is made to FIG. 7, which is based on news material, and FIG. 9, which is based on legal material.

Query expansion takes place in real time, while the user waits at a terminal. Response time must therefore be very short and consistent. The present invention provides consistently short response time by processing an expansion request using parallel operations distinguished by the source text collection.

Figure 1:
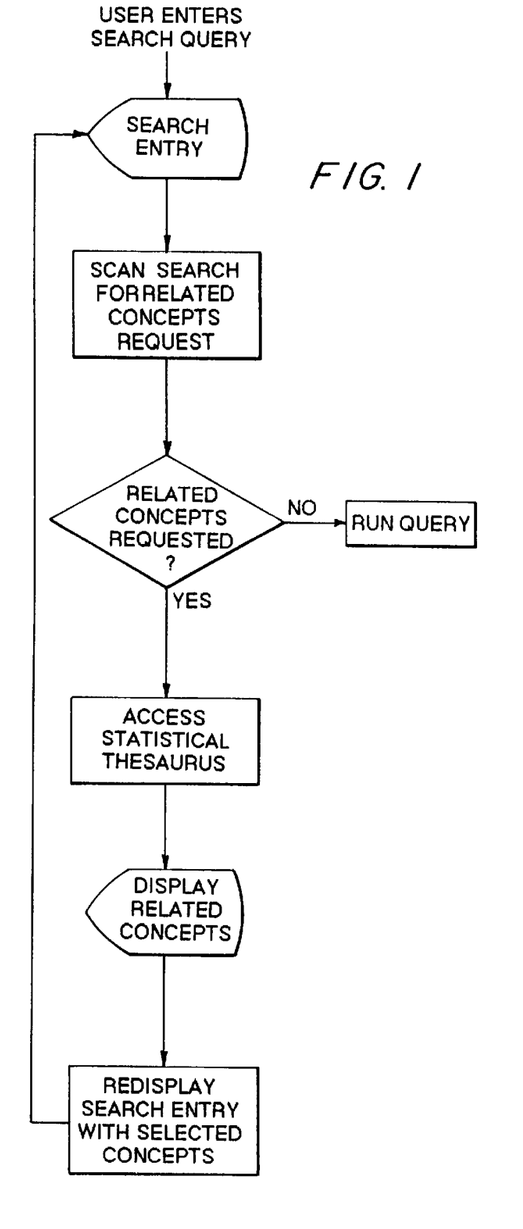
FIG. 1 illustrates a query expansion process involving use of a statistical thesaurus.

FIG. 1 illustrates a query expansion process. The process begins when the end user of the system enters a search query including one or more terms. The user may select to expand the query, as a whole for statistical retrieval, or by specific term or terms for boolean retrieval. If the user specifies The thesaurus includes plural collections, each collection being based on a respective test source (such as legal opinions, news stories, patent text, and so forth). The various collections are generated and searched in parallel, by respective (concurrently-executed) threads of a computer program. The collections include records. The records include groups of terms. The groups have weights (such as 1, 2, 3, 4 or 5) that constitute an indexing scheme that allows the user to interactively search the collections to generate query expansion terms.

The statistical thesaurus is a set of records, with each record containing a set of terms which are related to each other by their occurrence together in a body of text such as a document. The preferred embodiment of the invention designates five groups of terms in each record: Group 1 contains the most important terms from the body of text; group 2, the next most important terms; and so forth, through group 5 which contains the least important terms (although group 5 terms are still meaningful concepts within the body of text). These groupings in the document inherently reflect term weights for use in ranking the records during retrieval. The record may be generated by processing a body of text, and by extracting the important terms and phrases based on statistics using a suitable phrase recognition method such as that disclosed in application Ser. No. 08/589,468 which is incorporated herein by reference.

The statistical thesaurus for a given text collection is built by generating the records for a sampling of the documents within the collection. The sampling rate varies by collection type and size, with 100% being appropriate for small collections and as little as 10% for very large collections.

Significantly, the records are then grouped by the collections from which they were sampled. That way, the appropriate set of records can be accessed based on the collection selected by the user. For example, a first set of records may be formed based on federal case law documents, and a second set records may be formed based on news wires. When a user later searches case law, the first set of records is used for the statistical thesaurus. When the user is searching news material, the second set is used.

Figure 2:
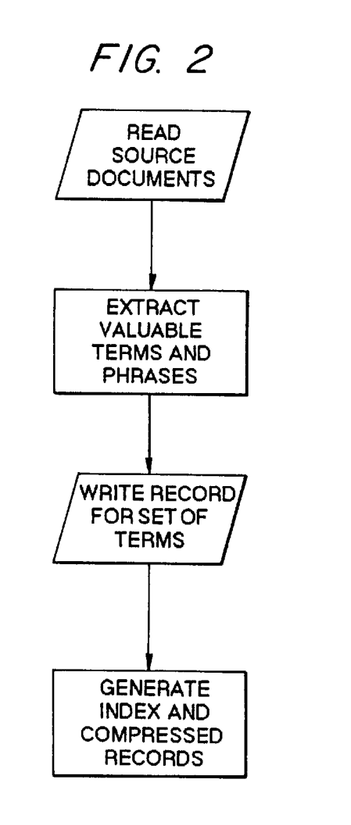
FIG. 2 illustrates a preferred process for forming a statistical thesaurus.

FIG. 2 illustrates a preferred process for forming a statistical thesaurus.

First, source documents are read, the valuable terms and phrases from the documents are extracted, and thesaurus "records" are written. The thesaurus records are essentially documents having a set of (for example) five groups (or document segments), each group inherently reflecting a ranking of the terms in the group.

The following is an example of a thesaurus "record" in a preferred embodiment, in which "murder" was the original query term:

GROUP1:
  @ felony murder rule @ @ felony murder @
GROUP2:
  @ murder @ @ malice @ @ harmless @
GROUP3:
  @ element of malice @ @ superfluous @ @ convicted of murder @ @ malice instruction @ @ degree murder @ @ habeas @ This simple example of a record contains terms only in the first three groups, due to the small size of the source document (the opinion in *Davis v. State of Tennessee and Larry Lack,* 856 F.2d 35; 1988 U.S. App. LEXIS 11941 (CA 6, 1988)). The "@" signs signal the beginning and end of terms to clearly delimit phrases. Of course, variations on this format lie within the contemplation of the present invention.

Figure 10A:
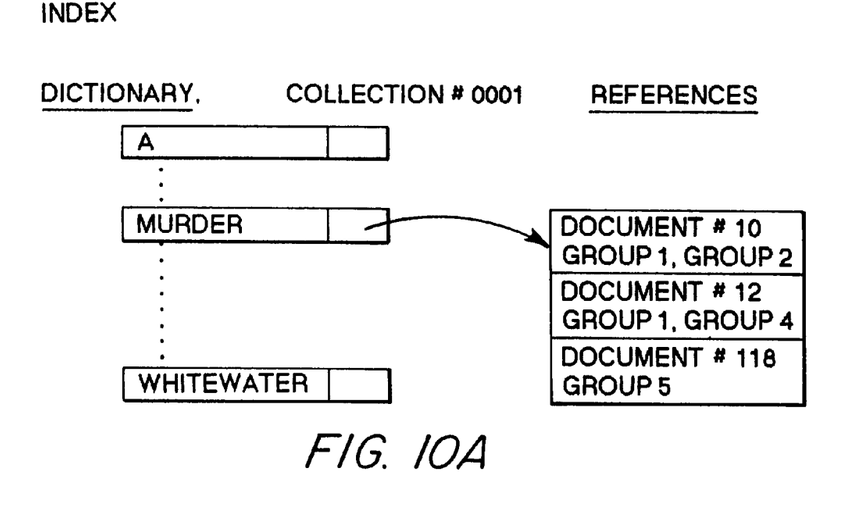
FIG. 10A illustrates an exemplary indexing scheme in a dictionary for a given collection, showing entries including a term in association with references to a document and a set of "groups" which reflect ranking of terms based on relevance.

The thesaurus records are then processed to build a statistical thesaurus index and to build compressed records which are optimized for use in later retrieval operations. FIG. 10A illustrates an exemplary indexing scheme in a dictionary for a given collection, showing entries including a term in association with references to a document and a set of "groups" which reflect ranking of terms based on relevance.

The index is a typical inverted text index, as known to those skilled in the art and as described by Salton in his text, *Automatic Text Processing.* Each term that appears in any record appears in the index with a list of records in which it appears.

Furthermore, the index also specifies which term group the term is in. Each record can be thought of as a document. Each group can be though of as a sub-portion (or segment) of the document such as a paragraph. The records are grouped by their source collection type (legal or news), and exist in many different physical collections. A physical collection has its own index file and compressed text file.

Figure 3:
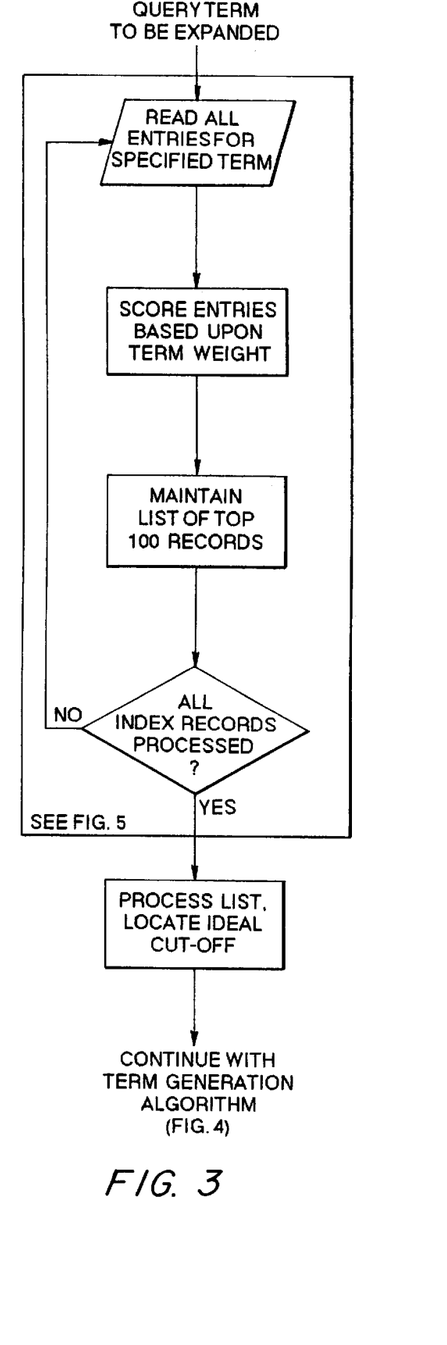
FIG. 3 illustrates a preferred record selection method.
Figure 4:
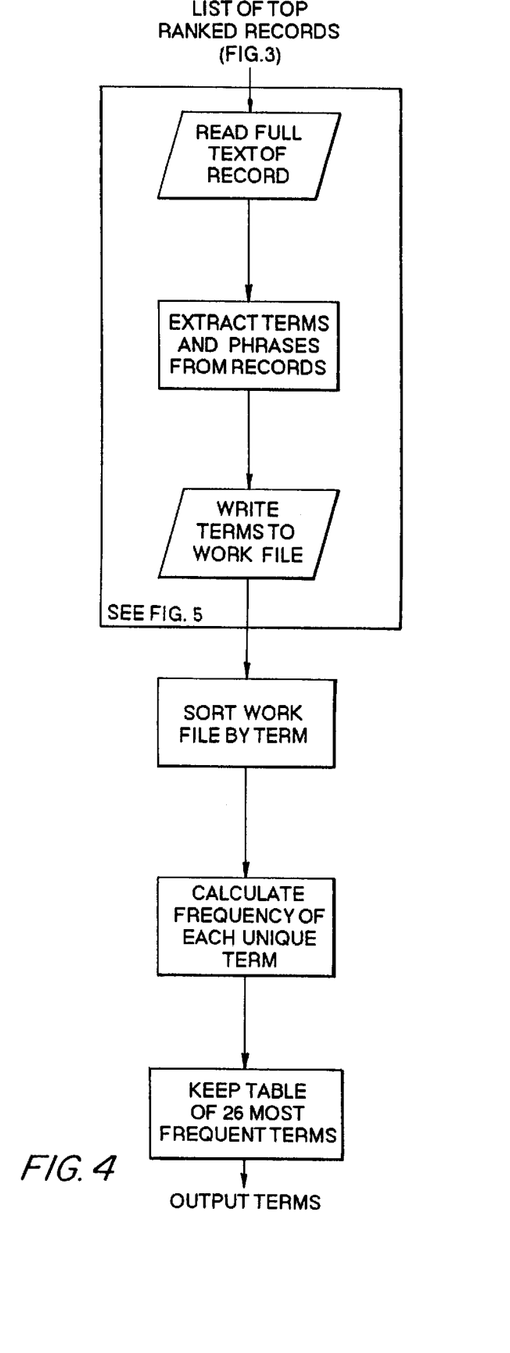
FIG. 4 illustrates a preferred term extraction process of the retrieval method.
Figure 5:
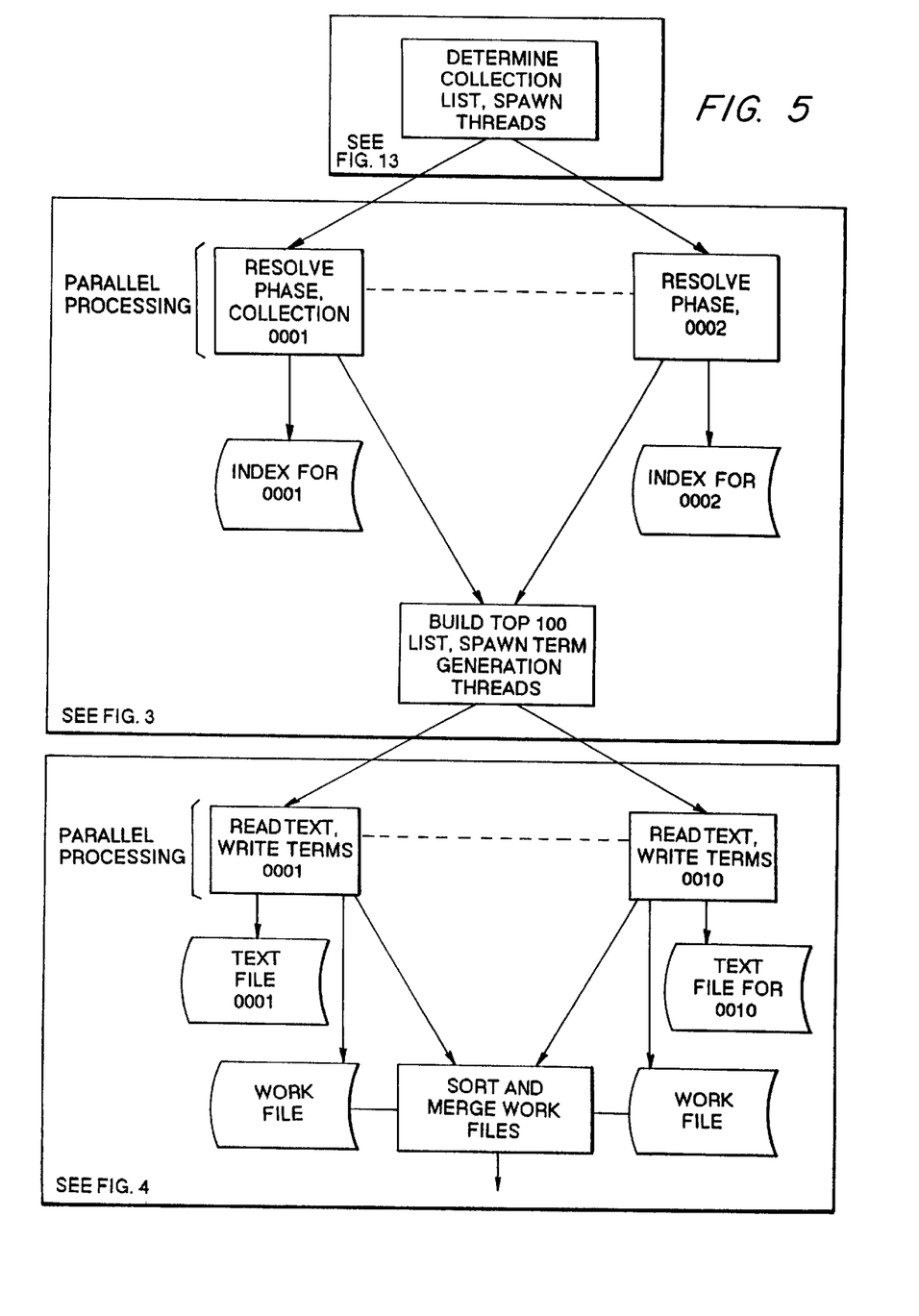
FIG. 5 illustrates various parallel phases in a preferred query expansion method according to the present invention.
Figure 13:
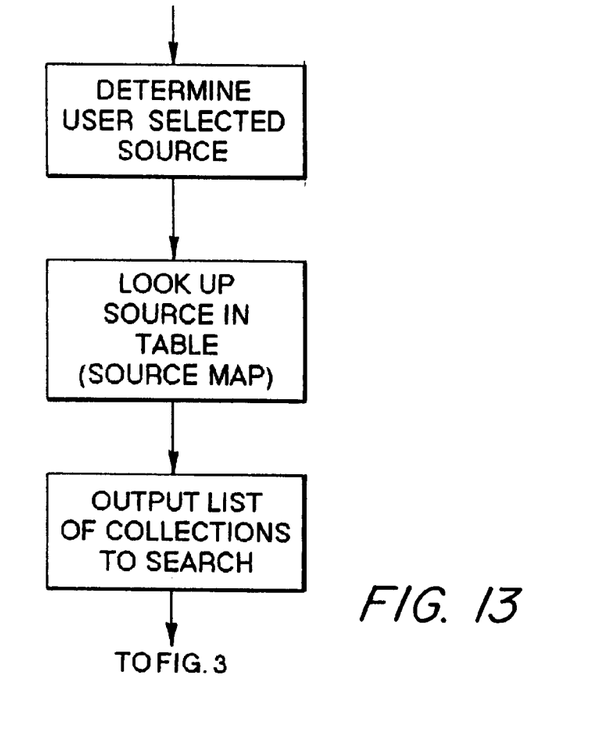
FIG. 13 shows a process of selecting collections on which to base subsequent query expansion terms.

FIG. 5 is a high-level illustration of the relationship of the processes of FIG. 13, FIG. 3, and FIG. 4. FIG. 13, FIG. 3, and FIG. 4 are now described.

FIG. 13 illustrates a preliminary process of selecting a collection which is to be searched in determining suitable query expansion terms. This process allows later processes to focus on a most appropriate source of phrases (case law, news wires, and so forth). First, the user-selected source is determined, and the source is looked up in a source map. A list of text source collections to be searched is then output. At this point, the processing illustrated in FIGS. 3 and 4 can take place.

Figure 12:
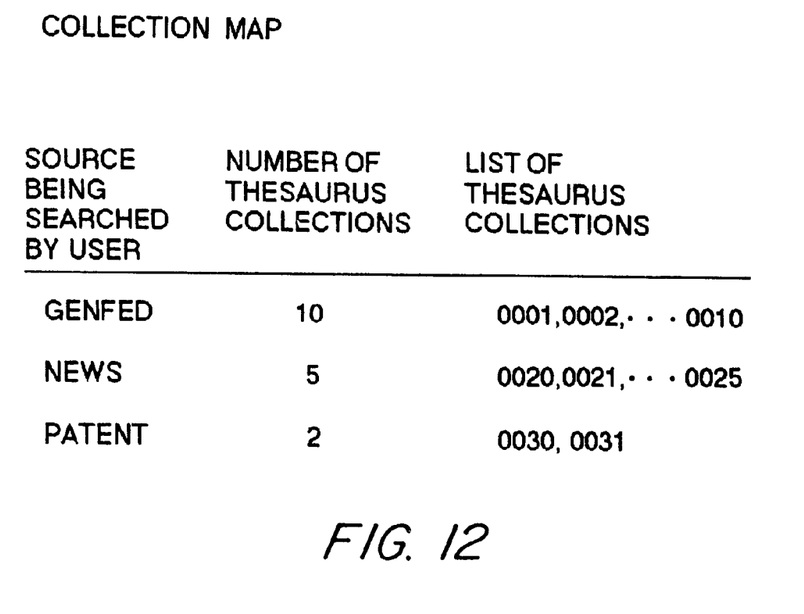
FIG. 12 shows a Collection Map illustrating a list of possible text sources (court cases, news wires, patents) in conjunction with respective numbers of collections present and lists of those collections.

FIG. 12 shows a Collection Map illustrating a list of possible text sources (court cases, news wires, patents) in conjunction with respective numbers of collections present and lists of those collections. The Collection Map is referenced to select a suitable collection.

FIG. 3 illustrates a preferred record selection method. After one or more terms have been specified by the user, this method involves selection of a set of records for those terms.

The method preferably has two embodiments, one for boolean queries and one for statistical queries. The boolean version is tuned for very high precision and a very small number of input terms, while the statistical query version is designed for a larger number of input terms.

The first phase of the retrieval involves accessing the index for the provided terms from the statistical thesaurus index. For boolean queries, the terms are "AND"ed together, while the statistical query terms are "OR"ed together. In this phase (which may be called a "resolve" phase), the specific locations within the records for the query terms are read from the index, and merged as necessary ("OR"ed or "AND"ed multiple terms). The output from the merge operation is a list of records, and term locations within the record.

The record is scored by tallying the "score" of the highest scoring location for each query term within the record, recognizing it is possible for a query term to appear multiple times within a record. Group 1 terms score 14 points, group 2 terms score 13 points, and so forth through group 5 terms which score 10 points. The maximum score for a record is 14 times the number of query terms. The minimum score is 10 times the number of query terms for boolean queries, and 10 for statistical queries.

Figure 10B:
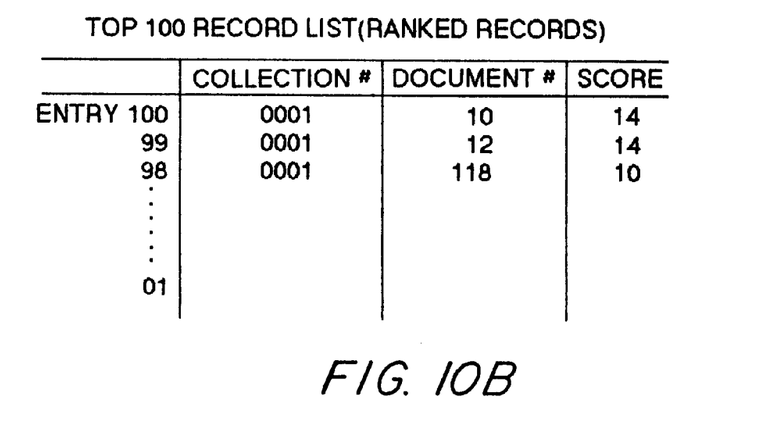
FIG. 10B illustrates an exemplary "Top 100" List of ranked records, showing a "collection" number (based on text source), a document number, and a score (based on rankings determined by group within a record).

After each record is scored, it is potentially inserted into a "Top 100" List, an illustrative example of which is shown in FIG. 10B. This list contains the highest-scoring 100 records encountered so far. The list is ordered by score, with the last entry being the highest-scoring entry. The current record is added to the list at the appropriate place, or discarded if it doesn't score high enough to make the list. The record at this point is a record number and a score.

When all records have been processed, the resolve phase is completed.

The List is then passed to find an ideal cutoff. Beginning with the last entry (the highest scoring entry), the list is processed in reverse. After 25 entries, if the score changes by more than 10 points, the list is cut between these two records. After 50 entries, the list is cut between any change in score. This cutoff routine tends to prevent contamination of good entries by substantially worse entries.

As illustrated in FIG. 4, after the list is cut, the term extraction portion of the retrieval takes place. For each record in the list, the compressed text file is accessed to read the complete text of the record. The terms in the record are then extracted and written to a work file.

Figure 11A:
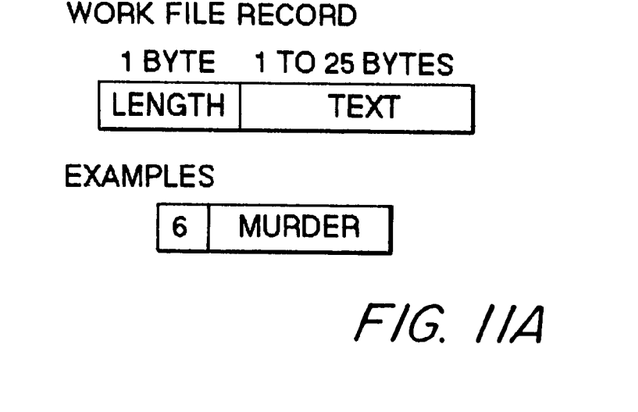
FIG. 11A illustrates an exemplary work file record which is used in processing described with reference to FIGS. 4 and 5.

An illustrative example of a work file is shown in FIG. 11A. It is understood that a work file is produced for each parallel thread. After all parallel threads have terminated, the results of the various work files are merged. The parallel thread implementation is described in greater detail with reference to FIG. 5.

If a term is a complete match with a query term, it is not written as it is already known to the user. For example, if "Clinton" and "Whitewater" are already the query terms, the phrase "Bill Clinton" would be written, but the single term "Whitewater" or the single term "Clinton" would not be written.

When all the records have been read and the terms have been written, the term extraction phase is completed, and the sort phase begins.

Figure 11B:
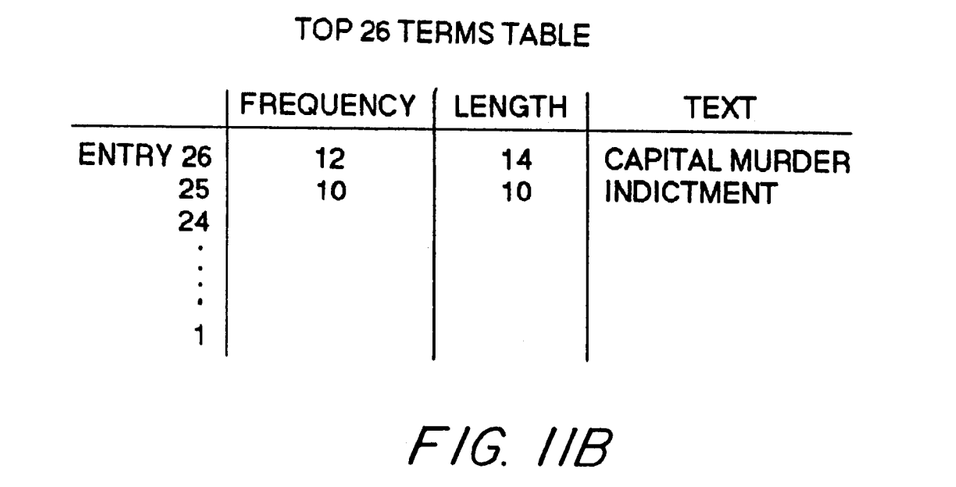
FIG. 11B illustrates a "Top 26" Terms Table showing terms ordered by frequency of occurrence.

The sort phase sorts the terms in the work file, and outputs the terms in alphabetical order. Multiple occurrences of the same term are now output consecutively. As they are output, the frequency of each term is calculated. A table of the top 26 terms, ranked by frequency, is maintained. FIG. 11B illustrates an exemplary "Top 26" Terms Table showing terms ordered by frequency of occurrence. In the preferred embodiment, a term must have a minimum frequency of 2 to be inserted into the table. After all sorted terms have been output, the Term Table is output to the end user.

The above method dynamically builds the list of related terms for any combination of query terms. Additionally, the collection of records may be supplemented at any time with only a small update to the index file.

FIG. 5 illustrates various parallel phases in a preferred query expansion method according to the present invention.

In order to achieve maximum performance, several phases in the above process are performed in parallel. A parallel thread is created for each physical collection being searched. The statistical thesaurus is preferably built in several small collections instead of a single large collection. Preferably, these collections are based on the source of text, such as case law or news wires.

As shown in FIG. 5, after the number of collections has been determined, a unique collection thread is spawned for each collection. These threads execute concurrently. That is, while one thread waits on a physical disk I/O, another thread may be processing. This parallelism allows the inventive process to be easily dividable across processors.

Also, as described with reference to FIG. 4, the reading of compressed records, and the extraction and writing of terms and phrases to a work file, are also performed in parallel, each of the parallel paths being distinguished by the source text collection.

Thus, the invention provides a statistical thesaurus built from multiple information sources. Significantly, the statistical thesaurus is managed so that many different combinations of records may be searched to correspond to the collection specified by the end user.

As a particular example of the advantages of forming query expansion based on source text collection, a user of the LEXIS-NEXIS™ system may select the library GEN-FED (which contains federal case law), the library NEWS (which contains news media documents), or the library PATENT (which contains the full text of U.S. patents). These are examples of the source text collections mentioned above. If the user is searching in GENFED and the topic is MURDER, the related concepts provide better search performance if they are derived from federal case law. Conversely, the news media search would work better if the term is expanded using records generated from news documents. The difference in terms is clearly illustrated in FIGS. 7 and 9: FIG. 7 shows related concepts for NEWS searches, while FIG. 9 shows related concepts for GENFED searches.

This process is managed by sampling document collections individually, and then maintaining the generated term records in separate collections. Then, significantly, the term record collections are combined dynamically based upon the document collection being searched by the end user.

Figure 14:
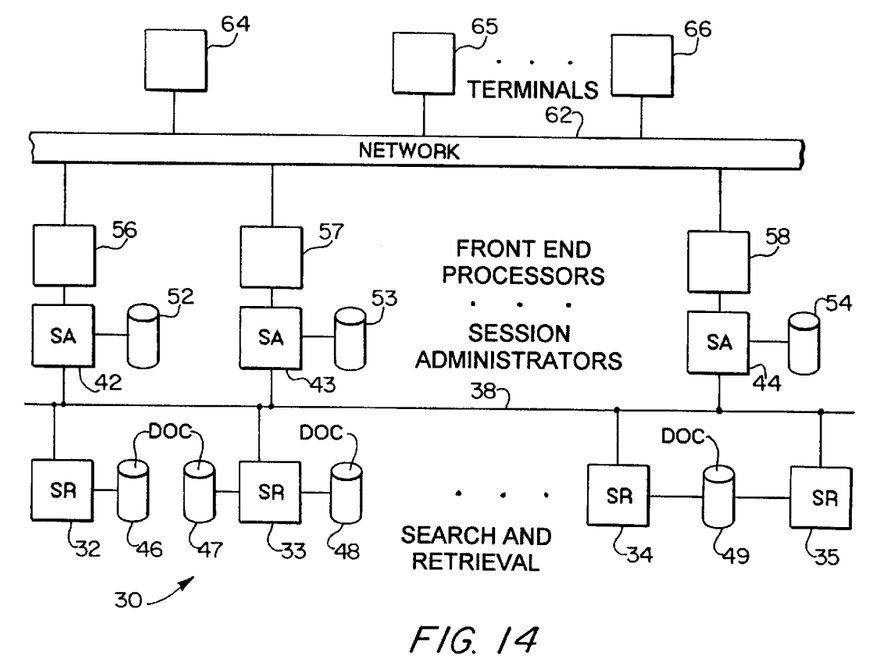
FIG. 14 illustrates an exemplary hardware platform on which the inventions related to the formation, storage, and use of the statistical thesaurus may be implemented.

A hardware environment in which the inventive thesaurus may be developed, stored and used is shown in FIG. 14. In particular, a document search and retrieval system 30 is shown. The system allows a user to search a subset of a plurality of documents for particular key words or phrases. The system then allows the user to view documents that match the search request. The system 30 comprises a plurality of Search and Retrieval (SR) computers 32–35 connected via a high speed interconnection 38 to a plurality of Session Administrator (SA) computers 42–44.

Each of the SR's 32–35 is connected to one or more document collections 46–49, each containing text for a plurality of documents, indexes therefor, and other ancillary data. More than one SR can access a single document collection. Also, a single SR can be provided access to more than one document collection. The SR's 32–35 can be implemented using a variety of commercially available computers well known in the art, such as Model EX 100 manufactured by Hitachi Data Systems of Santa Clara, Calif.

Each of the SA's 42–44 is provided access to data representing phrase and thesaurus dictionaries 52–54. The SA's 42–44 can also be implemented using a variety of commercially available computers, such as Models 5990 and 5995 manufactured by Amdahl Corporation of Sunnyvale, Calif. The interconnection 38 between the SR's and the SA's can be any one of a number of two-way high-speed computer data interconnections well known in the art, such as the Model 7200-DX manufactured by Network Systems Corporation of Minneapolis, Minn.

Each of the SA's 42–44 is connected to one of a plurality of front end processors 56–58. The front end processors 56–58 provide a connection of the system 30 one or more commonly available networks 62 for accessing digital data, such as an X.25 network, long distance telephone lines, and/or SprintNet. Connected to the network 62 are plural terminals 64–66 which provide users access to the system 30. Terminals 64–66 can be dumb terminals which simply process and display data inputs and outputs, or they can be one of a variety of readily available stand-alone computers, such as IBM or IBM-compatible personal computers. The front end processors 56–58 can be implemented by a variety of commercially available devices, such as Models 4745 and 4705 manufactured by the Amdahl Corporation of Sunnyvale, Calif.

The number of components shown in FIG. 14 are for illustrative purposes only. The system 30 described herein can have any number of SA's, SR's, front end processors, etc. Also, the distribution of processing described herein may be modified and may in fact be performed on a single computer without departing from the spirit and scope of the invention.

A user wishing to access the system 30 via one of the terminals 64–66 will use the network 62 to establish a connection, by means well known in the art, to one of the front end processors 56–58. The front end processors 56–58 handle communication with the user terminals 64–66 by providing output data for display by the terminals 64–66 and by processing terminal keyboard inputs entered by the user. The data output by the front end processors 56–58 includes text and screen commands. The front end processors 56–58 support screen control commands, such as the commonly known VT100 commands, which provide screen functionality to the terminals 64–66 such as clearing the screen and moving the cursor insertion point. The front end processors 56–58 can handle other known types of terminals and/or stand-alone computers by providing appropriate commands.

Each of the front end processors 56–58 communicates bidirectionally, by means well known in the art, with its corresponding one of the SA's 42–44. It is also possible to configure the system, in a manner well known in the art, such that one or more of the front end processors can communicate with more than one of the SA's 42–44. The front end processors 56–58 can be configured to "load balance" the SA's 42–44 in response to data flow patterns. The concept of load balancing is well known in the art.

Each of the SA's 42–44 contains an application program that processes search requests input by a user at one of the terminals 64–66 and passes the search request information onto one or more of the SR's 32–35 which perform the search and returns the results, including the text of the documents, to the SA's 42–44. The SA's 42–44 provide the user with text documents corresponding to the search results via the terminals 64–66. For a particular user session (i.e. a single user accessing the system via one of the terminals 64–66), a single one of the SA's 42–44 will interact with a user through an appropriate one of the front end processors 56–58.

The collection selection method (FIG. 13) may be executed in either the session administrator SA computers 42–44 or in the search and retrieval computers 32–35. The remainder of the methods described above (FIGS. 3, 4) are preferably executed on the search and retrieval computers 32–35.

Of course, the inventions related to the formation, storage, and application of the statistical thesaurus may be implemented on any of a variety of computer platforms, and should not be limited to the example mentioned above.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A system including a dynamic statistical thesaurus for use in interactively generating query expansion terms for use with an automated text document search and retrieval system, the system comprising:
   a) means for receiving at least one search query term;
   b) a plurality of collections of records, wherein:
      b1) each record in a collection corresponds to a respective document;
      b2) each record in a collection has term groups addressable by an indexing scheme;
      b3) the collections are distinguished from each other based on respective text sample sources; and
      b4) the term groups have different weights constituting part of the indexing scheme; and
   c) means for using the indexing scheme to allow a user to interactively search the plurality of collections to generate the query expansion terms to supplement the at least one search query term.

2. The system of claim 1, wherein:
   the search query term includes plural words constituting a phrase.

3. The system of claim 1, wherein:
   the collections in the plurality of collections are searched concurrently using respective threads in parallel as subsets of a larger set of physically distributed collections.

4. The system of claim 1, wherein the text sample sources include:
   a text sample source consisting essentially of text of court case legal opinions.

5. The system of claim 1, wherein the text sample sources include:
   a text sample source consisting essentially of text of news media documents.

6. The system of claim 1, wherein the text sample sources include:
   a text sample source consisting essentially of text of patent documents.

7. The system of claim 1, wherein the text sample sources include:
   a first text sample source consisting essentially of text of court case legal opinions;
   a second text sample source consisting essentially of text of news media documents; and
   a third text sample source consisting essentially of text of patent documents.

8. A ranking method for ranking term relationship records to allow a set of related concepts to be derived for query expansion, the ranking method comprising:
   a) assigning term weights for respective query terms;
   b) summing the weights to determine a score;
   c) discovering gaps that occur between scores of records from among a plurality of records that are being scored;
   d) assigning, to the scores of the plurality of records being scored, a cutoff score based on the discovered gaps in the scores; and
   e) accepting only records whose scores exceed the cutoff score; wherein the assigning step includes:
      d1) assigning the cutoff score so that, in the accepting step, few records are accepted when a large gap in score occurs.

9. The ranking method of claim 8, wherein the assigning step includes:
   assigning individual term weights to respective individual records that correspond to respective individual documents.

10. The ranking method of claim 8, wherein the assigning step includes:
    assigning term weights from among a set of only about five possible term weights.

11. A statistical thesaurus, comprising:
    a plurality of collections of indexed records;
    wherein:
    1) the records constitute respective documents;
    2) each document includes plural terms that are grouped by weight into different groups within the document; and
    3) the groups are indexed so as to allow the records to be searched by a conventional text document search and retrieval system so as to perform functions of:
       i) adding records to the indexed records and/or
       ii) forming a list of related concepts for possible inclusion in expansion query terms.

12. The statistical thesaurus of claim 11, wherein
    each document includes plural terms that are grouped by weight, from among about five possible different weights, into about five different respective groups within the document.

13. A query expansion method in a text document search and retrieval system using a statistical thesaurus to generate expansion query terms, the method comprising:
    dividing the statistical thesaurus into multiple small physical collections, each physical collection having its own index;
    searching the multiple collections in parallel, using the respective indexes; and
    merging the search results to form a list of related concepts to be included in the expansion query terms.

14. The method of claim 13, wherein the dividing step includes:
    dividing the statistical thesaurus into small physical collections distinguished based on mutually different text sample sources.

15. The system of claim 14, wherein the text sample sources include:
    a text sample source consisting essentially of text of court case legal opinions.

16. The system of claim 14, wherein the text sample sources include:
    a text sample source consisting essentially of text of news media documents.

17. The system of claim 14, wherein the text sample sources include:

a text sample source consisting essentially of text of patent documents.

18. The system of claim 14, wherein the text sample sources include:
   a first text sample source consisting essentially of text of court case legal opinions;
   a second text sample source consisting essentially of test of news media documents; and
   a third sample source consisting essentially of text of patent documents.

19. The method of claim 13, wherein the searching step includes:
   searching the multiple collections using threads in software.

* * * * *